United States Patent [19]

Kobayashi et al.

[11] Patent Number: 5,778,262
[45] Date of Patent: Jul. 7, 1998

[54] ZOOM FINDER

[75] Inventors: Hideo Kobayashi; Kazuaki Nagata, both of Omiya, Japan

[73] Assignee: Fuji Photo Optical Co., Ltd., Omiya, Japan

[21] Appl. No.: 723,874

[22] Filed: Sep. 23, 1996

[30] Foreign Application Priority Data

Sep. 25, 1995 [JP] Japan .................................... 7-246440

[51] Int. Cl.⁶ .......................... G03B 13/10; G03B 17/02
[52] U.S. Cl. ................................................ 396/84; 396/379
[58] Field of Search ............................................ 396/84, 379

[56] References Cited

U.S. PATENT DOCUMENTS 5,036,346   7/1991   Hatamori et al. .................. 354/195.12
5,068,678  11/1991   Mogamiya et al. .................... 354/199
5,325,140   6/1994   Torikoshi et al. ....................... 354/159
5,335,030   8/1994   Suzuka .................................. 354/149.1

*Primary Examiner*—Safet Metjahic
*Assistant Examiner*—Michael Dalakis
*Attorney, Agent, or Firm*—Sixbey, Friedman, Leedom & Ferguson; David S. Safran

[57] ABSTRACT

In a zoom finder incorporated into a camera with a zooming function, the power of a motor, which also serves as a motor for driving a lens barrel of a taking lens, is transmitted to a lens barrel driving gear, and it is transmitted via a gear train to a cam shaft, where a cam face for regulating positions of movable lenses in a finder variable magnification optical system is formed. The gear train is held by a gear holding plate, and is directly attached to the bottom of an AF/finder body frame, in which the cam shaft is mounted, with the gear holding plate. As a result, the backlash of the gear train can be small, and a hysteresis of a magnification and a visual field rate, hysteresis which is caused by the back and forth movement of the movable lenses, can be prevented.

3 Claims, 8 Drawing Sheets

ZOOM FINDER

BACKGROUND OF THE INVENTION

1. Field of the Invention

The invention relates to a zoom finder, and more particularly to a zoom finder, in which the power of a motor is transmitted to movable lenses via a gear train, and the focal length is changed by moving the movable lenses forward and backward in the direction of the optical axis.

2. Description of the Related Art

In a conventional zoom finder incorporated into a camera with a zooming function, movable lenses are arranged behind an objective lens, and the movable lenses are moved forward and backward in the direction of the optical axis. As a result, the focal length is changed, and a visual field corresponding to a photographic angle of view can be observed through an eyepiece. A driving mechanism for driving the movable lenses are composed of a motor for supplying motive power and plural gears for transmitting the power from the motor to the movable lenses.

In the conventional zoom finder, however, a gear train transmitting the power of the motor is held in a camera body frame. On the other hand, the movable lenses are held in a finder body frame. Then, there is a disadvantage in that an attachment error (such as looseness) easily occurs in a power transmission system. If there is a mechanical error in the power transmission system, the loss occurs in the power transmission, and thereby the accuracy in positioning the movable lenses deteriorates, and the accuracy of the finder magnification is consequently lowered. That is, since there is a large backlash of gears, a hysteresis of a magnification and a visual field rate occurs due to the back and forth movement.

SUMMARY OF THE INVENTION

The invention has been developed under the above-described circumstances, and has its object the provision of a zoom finder which can decrease an attachment error in a power transmission system between a motor for driving movable lenses and the movable lenses, and increase the accuracy in positioning the movable lenses.

In order to achieve the above-mentioned object, a zoom finder of the invention; in which one or more of movable lenses are arranged behind an objective lens, the power of a motor is transmitted via a gear train to a gear of a cam member, which drives the movable lenses, the cam member is rotated so that the movable lenses can move forward and backward in the direction of the optical axis of the movable lenses to change the focal length of the zoom finder, and a subject image passing through the objective lens and the movable lenses is observed through an eyepiece; is characterized in that the gear train is attached to a finder body frame holding therein the objective lens, the movable lenses, and the cam member.

According to the invention, the power of the motor is transmitted to the cam member via the gear, so that the cam member can rotate. When the cam member rotates, the movable lenses, which are arranged behind the objective lens, moves forward and backward in the direction of the optical axis, so that the focal length of the finder can be changed. In the invention, the gear train for transmitting the power of the motor is directly attached to the finder body frame. Therefore, it is possible to decrease errors in attachment of the gear train, and to make the backlash of the gear train less likely. The hysteresis resulting from the back and forth movement of the movable lenses can be prevented. As a result, the accuracy in positioning the movable lenses and changing the magnification of the finder can be improved.

In particular, the gear train, which transmits the power of the motor, is held by a gear holding plate attachable to the finder body frame, and the gear holding plate is directly attached to the finder body. Therefore, errors in attachment the gear train can be decreased, and the power of the motor can be transmitted without a loss. As a result, the accuracy in positioning the movable lenses and changing the magnification of the finder can be improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
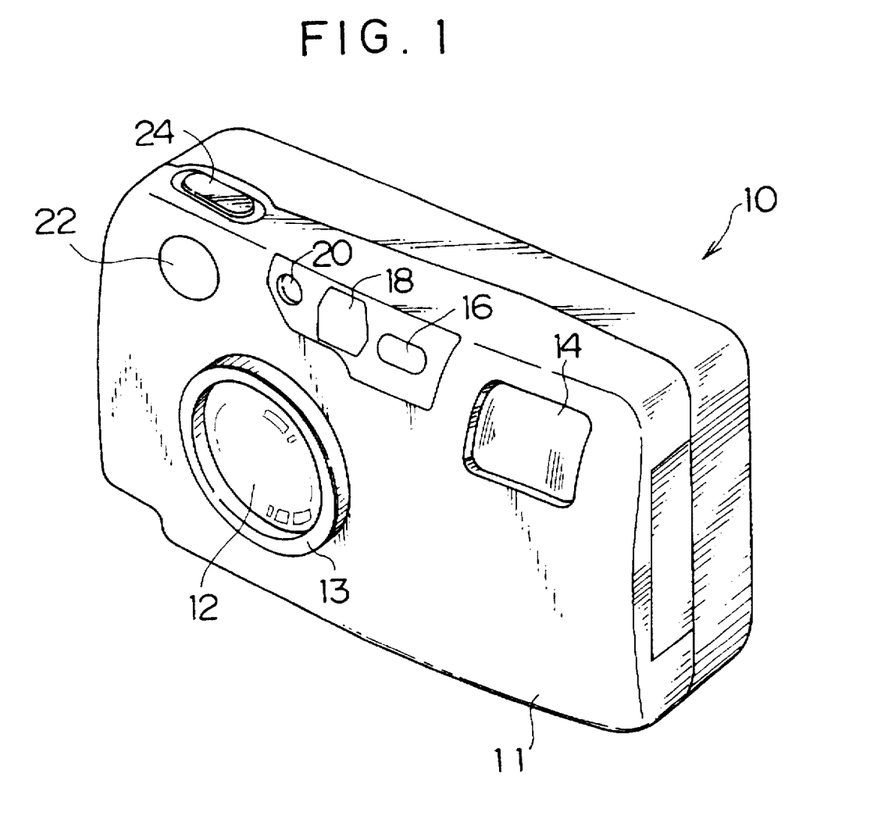
FIG. 1 is a perspective view illustrating an appearance of a camera to which a zoom finder of the invention is applied.

FIG. 1 is a perspective view illustrating an appearance of a camera to which a zoom finder according to the invention is applied. As shown in the figure, a lens barrel 13, which incorporates thereinto a taking lens 12, is attached to the central part of the front face of an exterior case 11 of a camera 10. A strobe window 14 is formed at the upper right corner of the front surface of the exterior case 11. A finder objective window 16, an AF light-projector window 18, a photometry window 20, and an AF light-acceptor window 22 are formed by the left-hand side of the strobe window 14. A shutter button 24 is provided at the top of the camera 10.

An AF light-projector part is provided at the inside of the AF light-projector window 18, and an AF light-acceptor part is provided at the inside of the AF light-acceptor window 22. An auto-focusing part (AF part) measuring a subject distance is composed of the AF light-projector part and the AF light-acceptor part. The AF part measures the subject distance based on, for example, the principle of triangulation. The result of the measurement is used for controlling the auto-focusing (AF).

A lens (not shown) through which the external light enters, and a photometry part, which comprises a light accepting element positioned at an image-forming position of the lens, are provided at the inside of the photometry window 20. The photometry part measures the intensity of the external light within the photographic visual field. The result of the measurement is used for controlling an exposure (AE control).

The taking lens 12 is composed of an optical system, which differs according to the type of the lens. For example, the focal length is changed in a range of f=25–55 mm in a twice zooming, and the focal length is changed in a range of f=30–90 mm in a three-time zooming. A zoom button (not shown) is provided at the back of the body of the camera 10.

Figure 5:
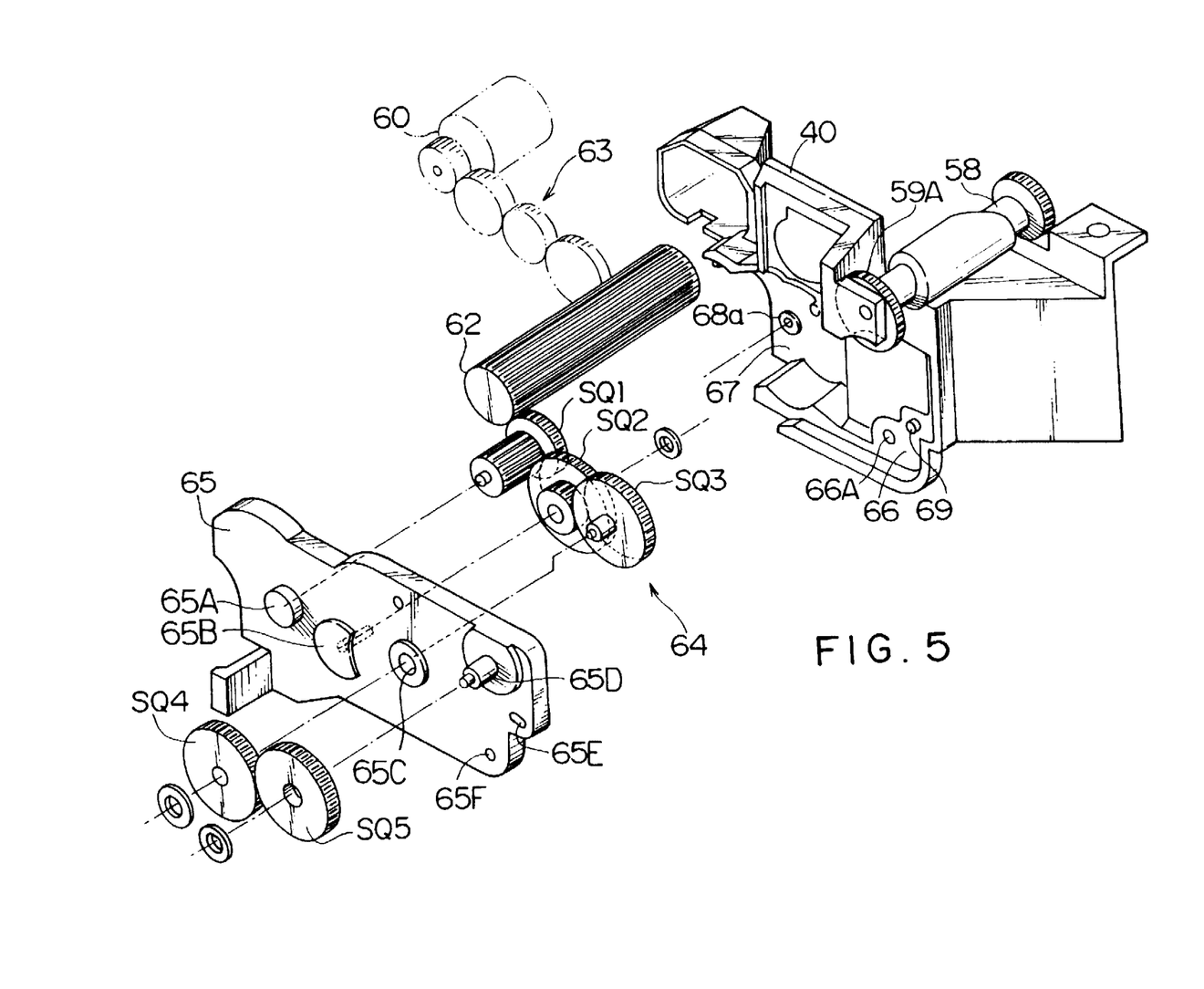
FIG. 5 is an exploded perspective view illustrating the structure of a power transmitting part of a driving mechanism.

When the zoom button is operated, a lens driving motor 60 is driven, and the driving force of the motor 60 is transmitted to a driving mechanism of the taking lens 12 and a driving mechanism of a movable lens system 38 of the zoom finder via a plurality of gears (see FIG. 5). The user can select a desired magnification by operating the zoom button, and can observe a visual field, which is substantially equal to an angle of view through an eyepiece of the finder. An explanation will be given later about the structure of the zoom finder and the driving mechanism in the movable lens system 38.

A shutter (not shown) is arranged on the optical axis of the taking lens 12 in the camera 10. The shutter moves in association with the operation of the shutter button 24.

Figure 2:
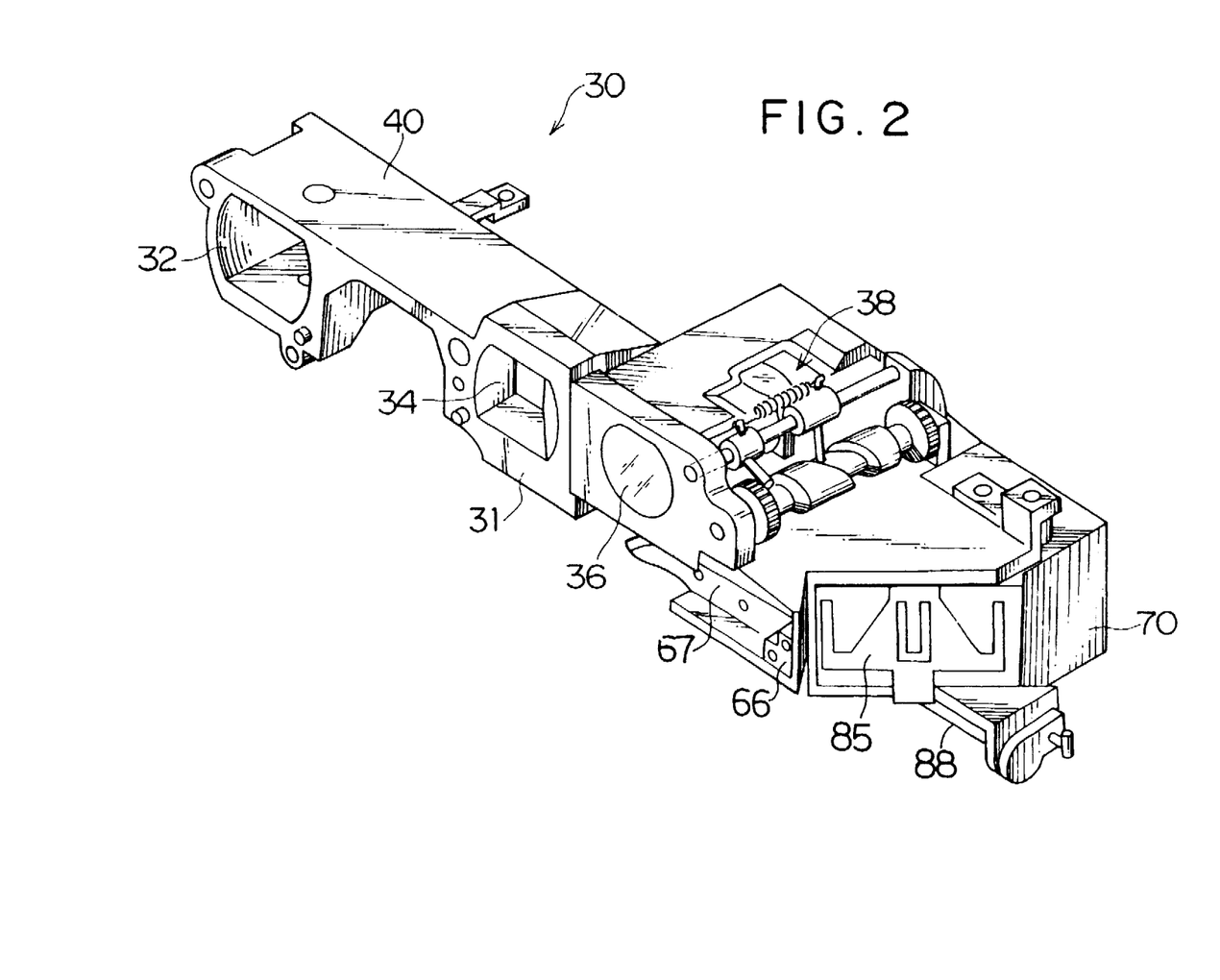
FIG. 2 is a perspective view illustrating a finder unit incorporated into the camera in FIG. 1.

FIG. 2 is a perspective view illustrating a finder unit 30 incorporated into the camera 10. An AF light-acceptor housing part 32 corresponding to the AF light-acceptor window 22, an AF light-projector housing part 34 corresponding to the AF light-projector window 18, and an objective lens 36 provided at the inside of the finder objective window 16 are arranged from the left-hand side in a unit frame 31 of the finder unit 30 as shown in FIG. 2.

Figure 3:
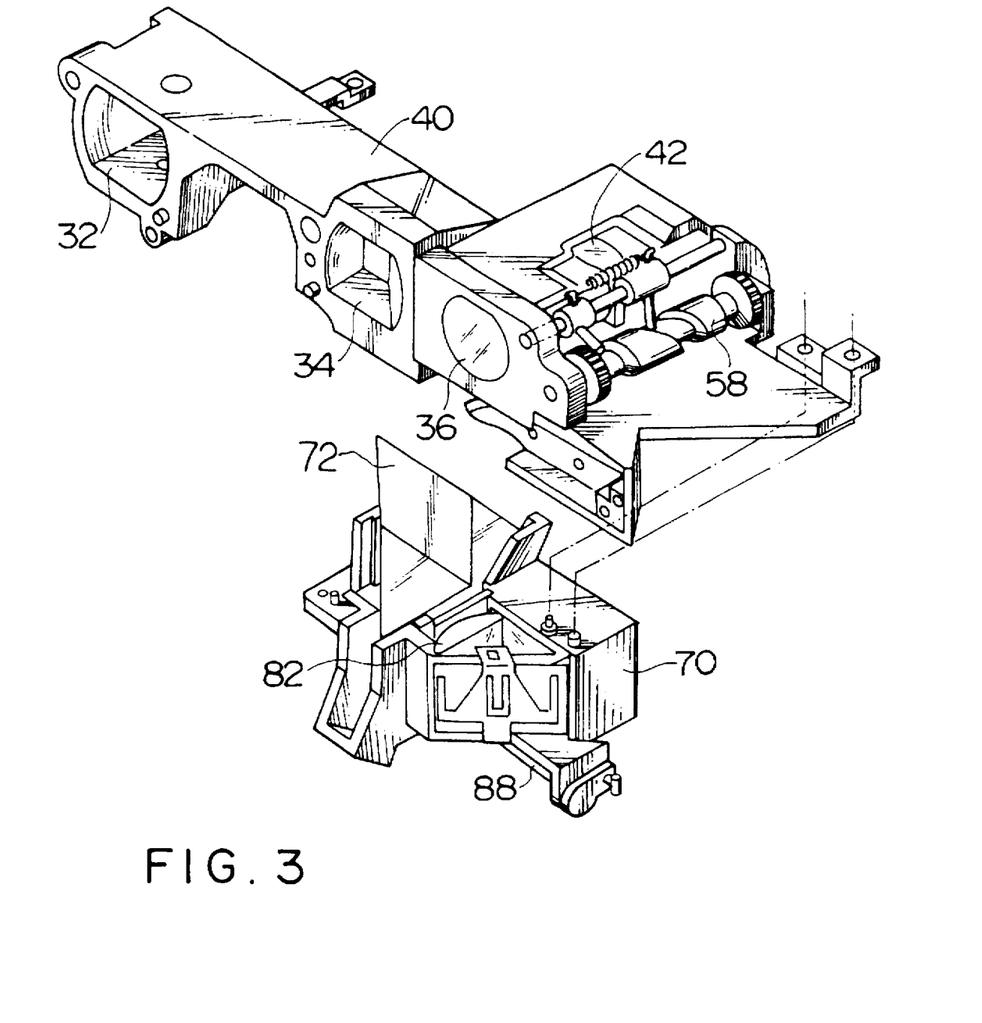
FIG. 3 is a perspective view illustrating the first block and the second block of a finder unit in FIG. 2.

In the finder unit 30, the unit frame 31 is divided into a first housing frame (an AF/finder body frame) 40 and a second housing frame (an eyepiece frame) 70 (see FIG. 3). The first block is formed in such a manner that the AF part (the AF light-acceptor part and the AF light-projector part), the objective lens 36, the movable lens system 38, and so forth are held in the AF/finder body frame 40. On the other hand, the second block is formed in such a manner that a prism 72 and an eyepiece 74 are held in the eyepiece frame 70.

Figure 4:
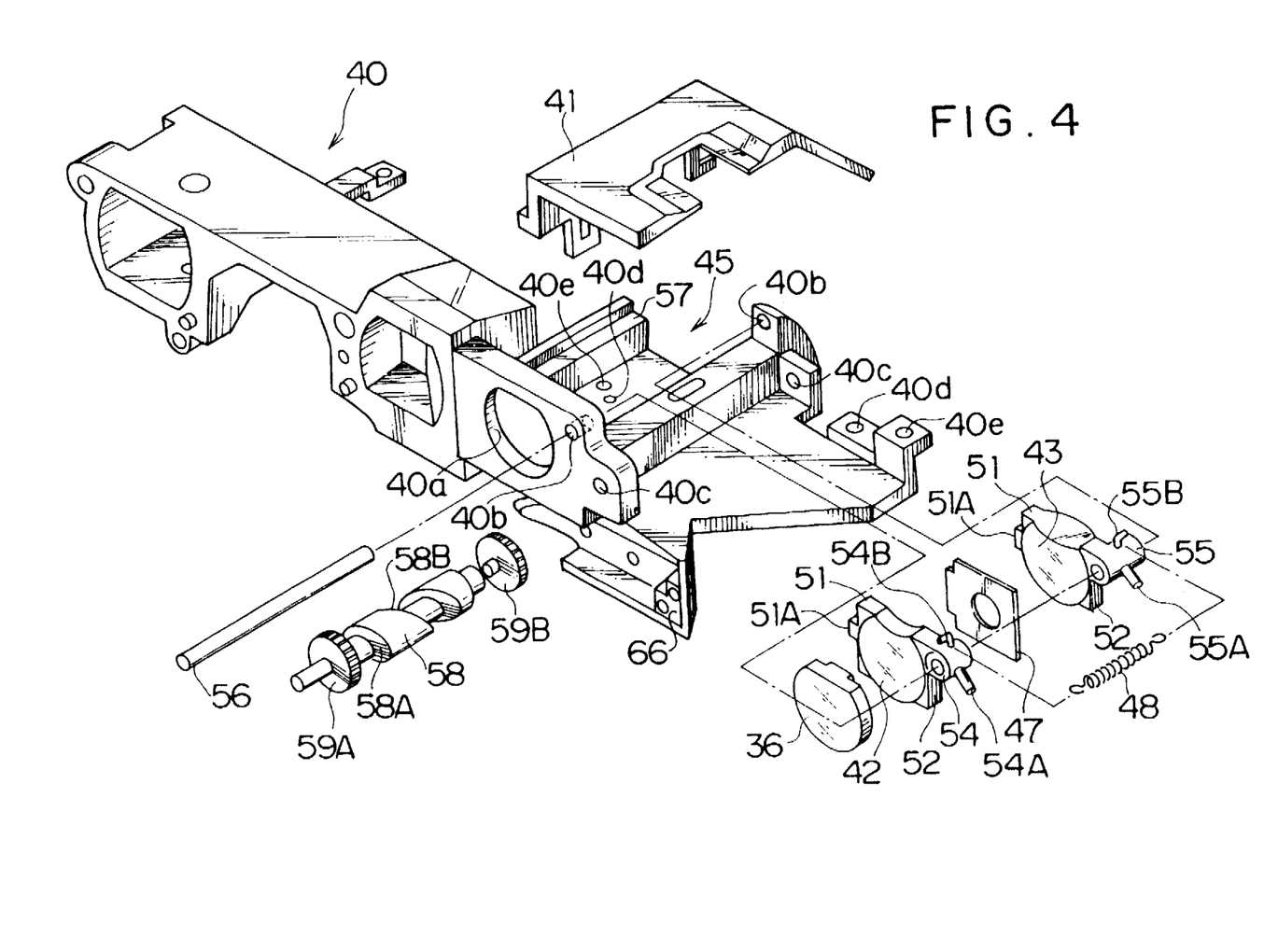
FIG. 4 is an exploded perspective view illustrating the first block of a finder unit.

FIG. 4 is an exploded perspective view illustrating the first block. As shown in the figure, the first block is constructed in such a manner that a finder variable magnification optical system and a driving mechanism of the finder variable magnification optical system are mounted in the AF/finder body frame 40.

The finder variable magnification optical system is composed of the objective lens 36 and movable lenses 42 and 43. The objective lens 36 is put into an objective lens opening window 40a formed at the front of the AF/finder body frame 40. The movable lenses 42 and 43 are received in a groove 45 to the back of the objective lens 36. A mask member 47 is provided between the movable lenses 42 and 43.

Flat parts 51 and 52 are formed at the right and left edges, respectively, of the movable lenses 42 and 43. Projections 51A and 51A are provided in such a manner to project from the flat parts 51 and 51, and guide holes 54 and 55 are formed in the flat parts 52 and 52, respectively. A guiding rod 56 is inserted into the guide holes 54 and 55. The front end of the guide rod 56 is thrust into a hole 40b formed in the front wall of the AF/finder body frame 40, and the back end of the guide rod 56 is thrust into a hole 40b formed in the back wall of the AF/finder body frame 40. The guiding rod 56 is thereby fixed at the position.

In the AF/finder body frame 40, a step 57 is formed at the upper part of the left-hand side of the groove 45 receiving the moving lenses 42 and 43. The projections 51A and 51A of the movable lenses 42 and 43 are positioned at the step 57. An objective cover 41 covers the groove 45 from above the movable lenses 42 and 43, so that a slide groove is formed between the step 57 and the bottom edge of the objective cover 41. The movable lenses 42 and 43 are guided along the slide groove via the projections 51A and 51A so as to move forward and backward, and the vertical play can be controlled.

Dependent pins 54A and 55A are provided in such a manner to project from the sides of the movable lenses 42 and 43, and the dependent pins 54A and 55A are engaged with a cam shaft 58, which is a member of the driving mechanism of the finder variable magnification optical system.

The driving mechanism of the finder variable magnification optical system is composed of the cam shaft 58, the motor 60 for rotating the cam shaft 58, and a power transmitting system for transmitting the power of the motor 60 to the cam shaft 58 (see FIG. 5). Cam faces 58A and 58B, which determine the optical positional relationship of the movable lenses 42 and 43, are formed at the circumference of the cam shaft 58. Both ends of the cam shaft 58 are thrust into holes 40c and 40c which are formed in the AF/finder body frame 40, and the cam shaft 58 is thereby fixed at the position.

The dependent pin 54A of the movable lens 42 abuts against the cam face 58A at the front of the cam shaft 58, and the dependent pin 55A of the movable lens 43 abuts against the cam face 58B at the back of the cam shaft 58. L-shaped hooks 54B and 55B are formed at the top of the movable lenses 42 and 43. An extension spring 48 is stretched between the hooks 54B and 55B. The dependent pin 54A is pressed against the cam face 58A, and the dependent pin 55A is pressed against the cam face 58B by the elastic force of the extension spring 48. As a result, the relative positions of the movable lenses 42 and 43 are regulated.

The motor 60 also serves as the driving motor for the lens barrel 13 of the taking lens 12, and the rotational force of the motor 60 is transmitted to a cam gear 59A which is secured to the front of the cam shaft 58, via the power transmitting system. That is, the cam shaft 58 rotates in connection with the lens barrel 13. As a result, the angle of view corresponds to the finder visual field range. Incidentally, a gear 59B at the back of the cam shaft 58 is connected with a strobe mechanism (not shown).

FIG. 5 is a perspective view illustrating the structure of the power transmitting system of the driving mechanism of the finder variable magnification optical system. The power transmitting system is composed of a gear train 63 which transmits the power of the motor 60 to a lens barrel driving gear 62, and a gear train 64 which transmits the power of the motor 60 to the cam shaft 58 in connection with the lens barrel driving gear 62. This embodiment is characterized in that the latter gear train, that is, the gear train 64 which transmits the power of the motor 60 to the cam shaft 58 in connection with the lens barrel driving gear 62, is held by a gear holding plate 65, and the gear train 64 and the gear holding plate 65 are both attached to the AF/finder body frame 40.

The gear train 64 which transmits the power to the cam shaft 58 in connection with the lens barrel driving gear 62, is composed of three gears SQ1, SQ2 and SQ3 which are supported by the back of the gear holding plate 65, and two gears SQ4 and SQ5 which are supported by the front of the gear holding plate 65. As shown in FIG. 5, the gears SQ1 and SQ2 are double-gears, and the shaft of the gear SQ1 is engaged with a concave part 65A at the back of the gear holding plate 65, and the shaft of the gear SQ2 is supported by an axis (not shown) projecting from a concave portion 65B at the back of the gear holding plate 65. The shaft of the gear SQ3 is inserted into a hole 65C formed in the gear holding plate 65, and the gear SQ4 is secured to the shaft of the gear SQ3 across the gear holding plate 65. The gear SQ5 is supported by the shaft 65D projecting from the front of the gear holding plate, and the gear SQ5 is engaged with the SQ4. The gears SQ1, SQ2, SQ3, SQ4, and SQ5, which compose the gear train 64, are thus held by the gear holding plate 65.

A flat part 66, to which the gear holding plate 65 is attached, and a step 67, which receives the gears SQ1, SQ2, and SQ3, are formed at the bottom of the AF/finder body frame 40, where the cam shaft 58 is mounted. A shaft end supporting part 68a, which is engaged with the shaft end of the gear SQ1, is formed in the step 67.

Figure 6:
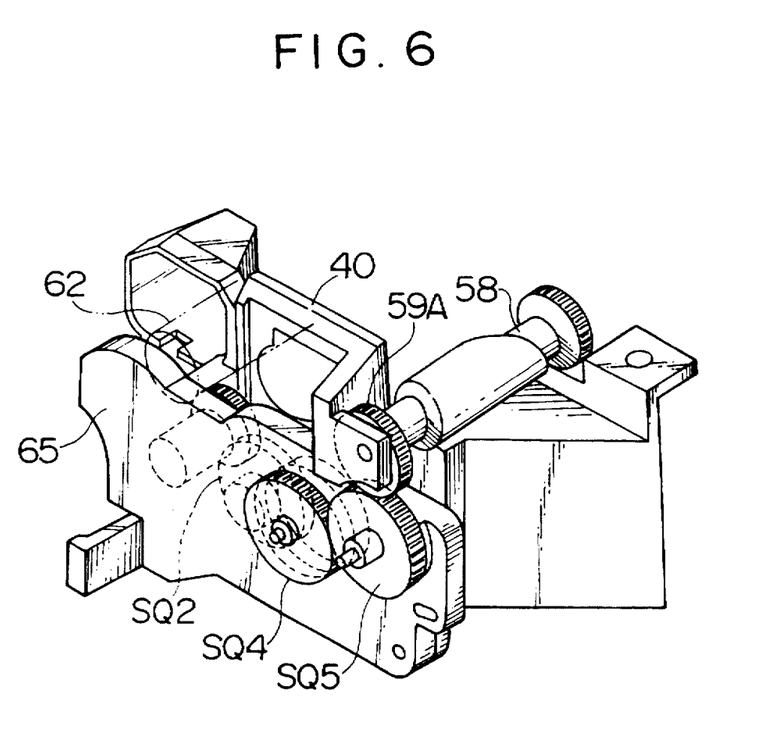
FIG. 6 is a perspective view illustrating a state that a gear train is attached to a frame of a finder body.

A pin 69 projects from the flat part 66 formed at the bottom of the AF/finder body frame 40, and the pin 69 is engaged with a hole 65E formed in the proximity of the right end of the gear holding plate 65 so that the pin 69 can be used for positioning when the gear holding plate 65 is attached. The shaft end of the gear SQ1 is engaged with the shaft end supporting part 68a. A hole 65F formed in the proximity of the lower right corner of the gear holding plate 65 is aligned with a hole 66A formed in the flat part 66, so that the gear holding plate 65 can connect with the AF/finder body frame 40 by a screw as shown in FIG. 6. The gears SQ1, SQ2, and SQ3 which are held by the back of the gear holding plate 65 are received in the step 67. The gear SQ5 at the front of the gear holding plate 65 is engaged with the cam gear 59A at the front of the cam shaft 58. As stated above, the gear train 64 which is held by the gear holding plate 65, is directly attached to the AF/finder body frame 40 with the gear holding plate 65.

Figure 7:
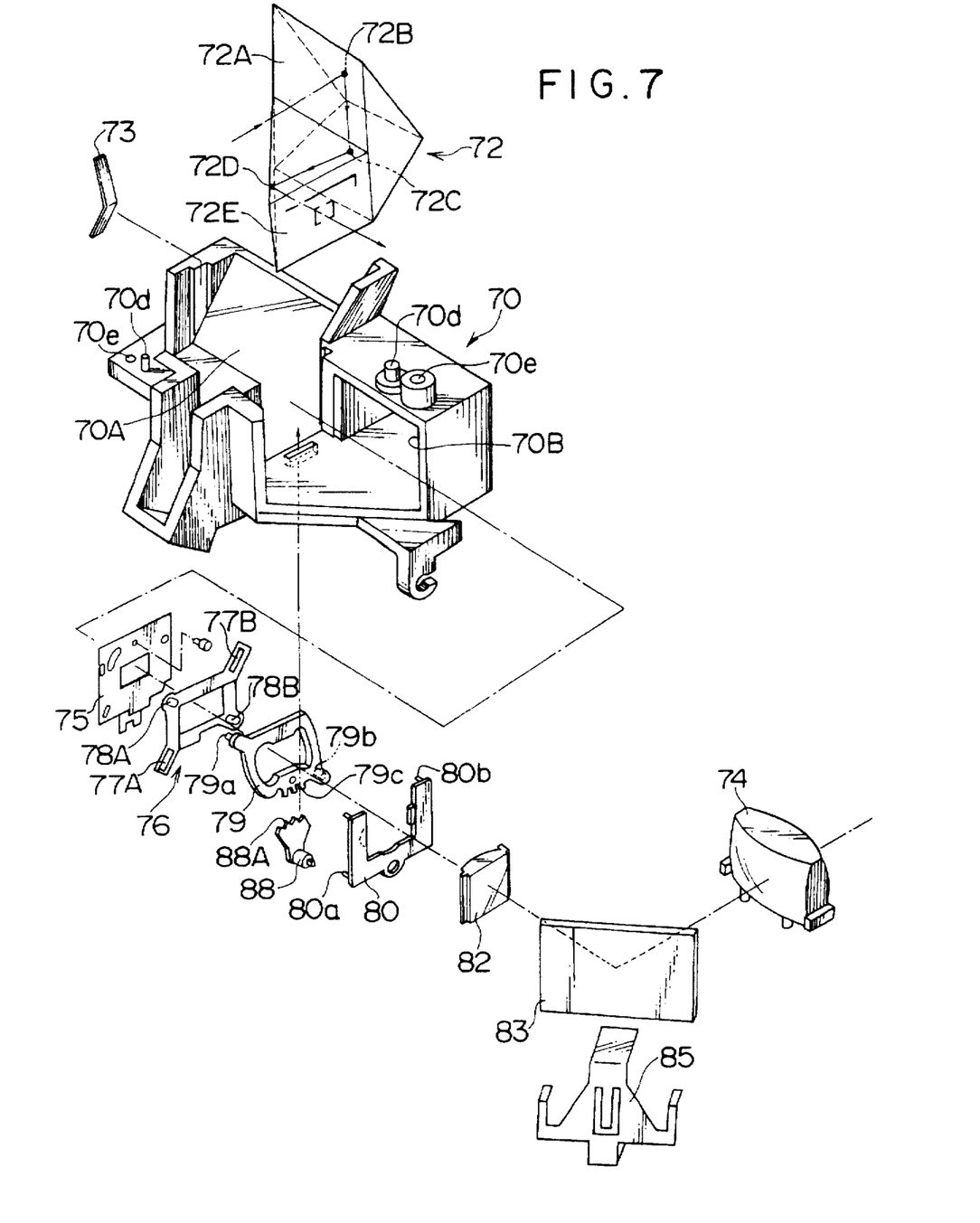
FIG. 7 is an exploded perspective view illustrating the second block of a finder unit.

FIG. 7 is an exploded perspective view illustrating the second block. As shown in the figure, the second block is constructed in such a manner that the prism 72, a high-vision (H) visual field frame 75, a conventional/panoramic (CP) visual field frame 76, a visual field switching lever 79, a visual field frame base 80, a field lens 82, a mirror 83, the eyepiece 74, etc. are mounted in the eyepiece frame 70.

The prism 72 is received in the eyepiece frame 70 along a slope 70A formed at the upper part of the eyepiece frame 70. The prism 72 is pressed to the right-hand side by a prism pressing plate 73 and is steadily positioned in the eyepiece frame 70.

The prism 72 is formed in such a manner that two rectangular prisms are combined, and it reflects the incident subject light three times to obtain a correct image. That is, the subject light passing through the zooming optical system enters the prism 72 via an incident plane 72A, and then the subject light is reflected downward by a reflection plane 72B at an angle of 90°. Then, the subject light is reflected forward by a reflection plane 72C at an angle of 90°, and then the subject light is horizontally (laterally) reflected by a reflection plane 72D at an angle of 90°. The subject light exits from an exit plane 72E, which is perpendicular to the incident plane 72A. A target mark and a parallax compensation mark are inscribed on the exit plane 72E, and the subject image is formed on the exit plane 72E.

The H visual field frame 75 provided close to the exit plane 72E of the prism is a fixed frame, which determines a visual field at an angle of view corresponding to the high-vision (H) size of a print aspect ratio (PAR). The H visual field frame 75 determines an area which is larger than the conventional (C) size or the panoramic (P) size.

The CP visual field frame 76, which can switch and determine the visual fields according to the C or P size, is provided behind the H visual field frame 75. The CP visual field frame 76 is composed of a pair of substantially L-shaped visual field frame pieces 76a and 76b, the visual field switching lever 79, and the visual field frame base 80. The pair of the visual field frame pieces 76a and 76b are vertically arranged to face each other. The CP visual field frame 76 determines the visual field area of the C or P size by moving the pair of the visual field frame pieces 76a and 76b in a direction in that they become closer to each other or far from each other at an angle of 45°.

Rectangular stroke holes 77A and 77B are diagonally formed in both ends of the visual field frame pieces 76a and 76b, respectively, at an angle of 45°. Pins 80a and 80b projecting from the visual field frame base 80 are engaged with the stroke holes 77A and 77B, respectively. Slots 78A and 78B are formed in the proximity of the corners of the visual field frame pieces 76a and 76b. Pins 79a and 79b projecting from the visual field switching lever 79 are engaged with the slots 78A and 78B, respectively.

An arc guiding groove is formed at the front of the visual field frame base 80 to guide the rotation of the visual field switching lever 79. The visual field switching lever 79 is guided by the arc guiding groove to rotate, so that the visual field is switched by the visual field frame pieces 76a and 76b.

The field lens 82 is fixed to the back of the visual field frame base 80, and the mirror 83 is fixed to the back of the field lens 82. The mirror 83 is placed at the edge surface part of the second housing frame 70 at an angle of 45° with regard to the exit plane of the field lens 82. A mirror pressing plate 85 presses the mirror 83 from behind, and the mirror 83 is fixed to the eyepiece frame 70. The optical axis of the exit plane 72E of the prism 72 is reflected toward the back of the camera 10 at an angle of 90°, and is led to the eyepiece 74.

The eyepiece 74 is attached to an opening 70B formed in the eyepiece frame 70, via a diopter adjustment cam (not shown) in such a manner as to move forward and backward. The diopter adjustment cam connects to a diopter adjustment control. The user turns the diopter adjustment control so as to move the eyepiece 74 forward and backward. As a result, the diopter can be adjusted.

As described above, the second block is united so that the prism 72 and all of the optical parts behind the prism 72 are accommodated in the eyepiece frame 70. On the other hand, the first block in FIG. 4 is united so that the optical parts in front of the prism 72 and the AF part are accommodated in the AF/finder body frame 40. In order that the second block is attached to the bottom of the first block, projections 70d and 70d which are provided at the second block (see FIG. 7) are put into holes 40d and 40d which are formed in the AF/finder body frame 40 of the first block (see FIG. 4). Furthermore, holes 40e and 40e of the first block (see FIG. 4) and holes 70e and 70e of the second block (see FIG. 4) are put together, and then they are connected by screws from above. As a result, the first and second blocks are united to be the finder unit as shown in FIG. 2.

On the other hand, a gear 79c is formed at the lower part of the visual field switching lever 79, and the gear 79c is engaged with a switching gear 88A formed at an end of a visual field switching shaft 88 in FIG. 7.

Figure 8:
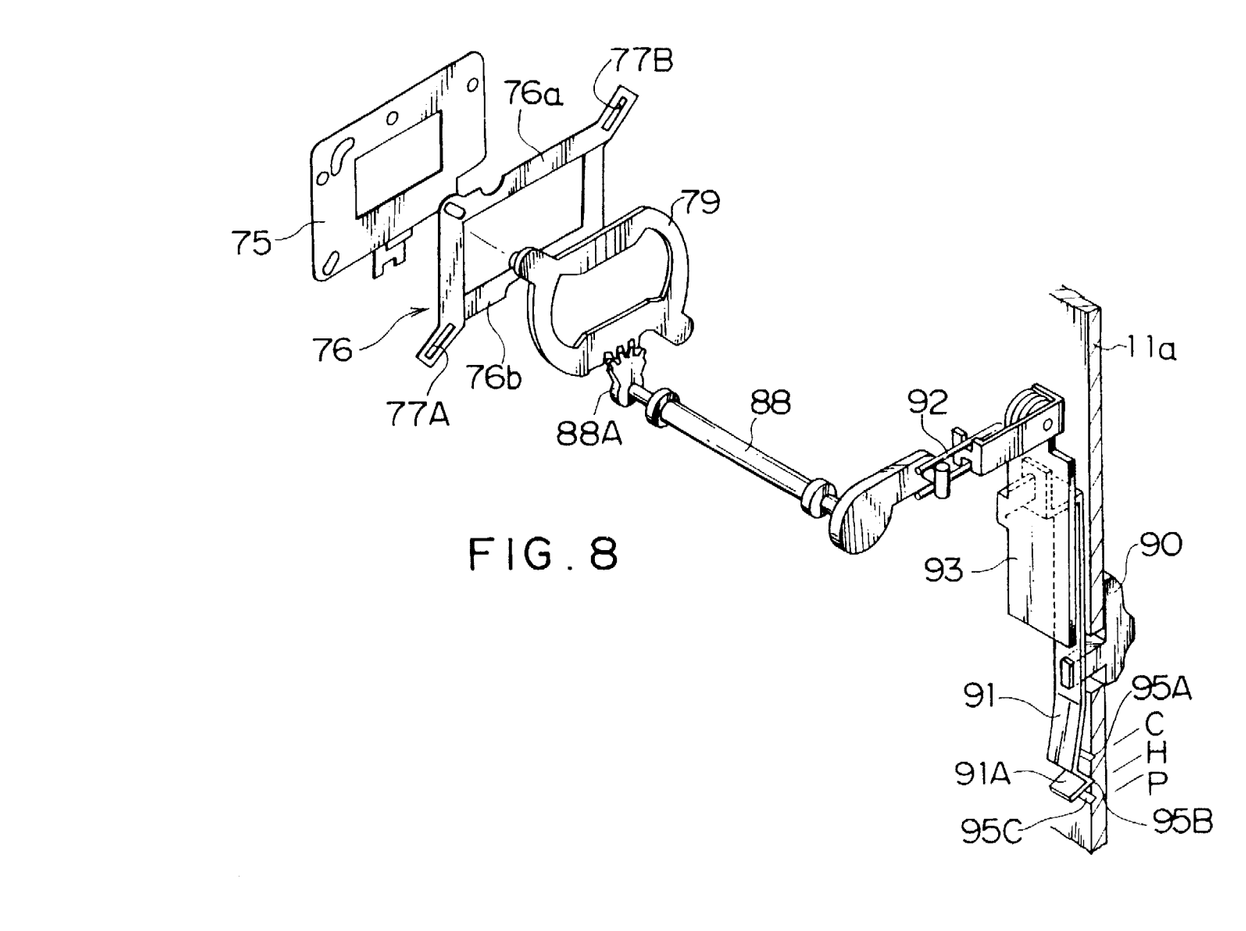
FIG. 8 is a view illustrating the structure of a finder visual field changing mechanism.

FIG. 8 is a view illustrating the structure of a visual field switching mechanism. As shown in the figure, the visual field switching mechanism comprises: a PAR control 90 provided at a back face 11a of the camera so as to move up and down; a PAR armature 91 connecting to the PAR control 90 and moving up and down in connection with the PAR control 90; and a CHP lever 93 connecting to the PAR armature 91. A spring 92 is provided for transmitting the up and down movement of the PAR armature 91 to the visual field switching shaft 88.

Click grooves 95A, 95B, and 95C are formed at the inside of the back face 11a of the camera so as to control a position where the PAR armature 91 stops. The click grooves 95A, 95B, and 95C are used for switching of the C, H, and P sizes, respectively. A nail 91A is bent to be formed at the PAR armature 91, and it is engaged with one of the click grooves 95A, 95B and 95C. Then, the PAR control 90 is switched in three levels C, H, and P.

One end of the visual field switching axis 88 connects to the gear 79c of the visual field switching lever 79 via the switching gear 88A, and the other end connects to a CHP lever 93 via the CHP spring 92. Thus, if the PAR control 90 is switched up or down, the PAR armature 91 and the CHP lever 93 move up or down. Then, the movement of the CHP lever 93 is transmitted to the visual field switching shaft 88 via the spring 92.

The C or P size is such a size that the area of the high-vision size is partially limited. The fixed frame of the H visual field frame 75 is used, and the pair of the visual field frame pieces 76a and 76b are vertically combined to face each other, then both visual field frame pieces 76a and 76b can move diagonally. As a result, the visual field can be switched so as to conform to the H, C, or P size.

According to the camera which incorporates thereinto a zoom finder constructed in the above-mentioned manner, when the user operates the zoom switch, the power of the motor 60 is transmitted to the lens barrel driving gear 62 via the gear train 63 as shown in FIG. 5. The lens barrel driving gear 62 rotates to drive the lens barrel 13 of the taking lens 12, so that the focal length of the taking lens 12 can be changed. On the other hand, the gear SQ1 which is engaged with the lens barrel driving gear 62, rotates in connection with the lens barrel driving gear 62. That is, as shown in FIG. 5, the rotational force of the gear SQ1 is transmitted to the gears SQ2, SQ3, SQ4, and SQ5 sequentially, and then it is transmitted to the cam gear 59A secured to the cam shaft 58.

When the cam shaft 58 rotates via the cam gear 59A, the positions of the movable lenses 42 and 43 are regulated by the cam faces 58A and 58B at the circumference of the cam shaft 58, and the focal length of the finder optical system is changed.

That is, the cam shaft 58 rotates in connection with the focus changing mechanism of the taking lens 12, so that a subject image which is substantially equal to a subject image obtained by a taking lens system can be formed at the eyepiece part of the finder.

In this embodiment, as shown in FIGS. 5 and 6, the gears SQ1, SQ2, SQ3, SQ4, and SQ5, which are interlocked with the lens barrel driving gear 62 and transmit the power of the motor 60 to the cam shaft 58, are held by the gear holding plate 65. The gear holding plate 65 holding the gear train 64, which is composed of the five gears, is directly attached to the AF/finder body frame 40. Therefore, the gear train, 65 which is the power transmission system, and the movable lens system, which is driven by the power transmitted via the gear train, are both held by the finder body frame, so that the error (such as looseness) in attachment the power transmitting gears can be decreased. As a result, the backlash of the gears can be small, and the hysteresis of the magnification and the visual field rate, hysteresis which occurs due to the back and forth movement of the movable lenses, can be prevented. The accuracy in positioning the movable lenses in the finder variable magnification optical system and changing the magnification of the finder can be improved as a result.

In the above-described embodiment, the explanation is given about the case that the gear holding plate holds the five gears SQ1 through SQ5. However, any other number of gears may be held by the gear holding plate. Moreover, the gear train may be directly held by the AF/finder body frame instead of the gear holding plate.

Furthermore, in the above-described embodiment, the explanation is given about the zoom finder which is able to switch the visual fields in three levels of C, H, and P. However, the invention may be applied to a zoom finder connected with the focal length changing mechanism of the taking lens whether the visual fields are switched or not.

As set forth hereinabove, according to the zoom finder of the invention, the gear train which transmits the power of the motor, and the cam member and the movable lenses, which are driven by the power transmitted via the gear train, are held together in the finder body frame. Therefore, it is possible to decrease an error in attachment the gear train, and the backlash of the gear train can be small. As a result, the hysteresis of the magnification and the visual field rate, hysteresis which is caused by the back and forth movement of the movable lenses, can be prevented, and the accuracy in positioning the movable lenses and changing the magnification of the finder can be improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A zoom finder comprising at least one movable lens arranged behind an objective lens, a cam member having a cam and a gear for producing rotation of the cam, a gear train having a plurality of gears and being connected to the gear of the cam member for driving said at least one movable lens by rotating said cam member for driving said at least one movable lens forward and backward in the direction of the optical axis of said at least one movable lens to change the focal length of said zoom finder, and enabling a subject image passing through said objective lens and said at least one movable lens to be observed through an eyepiece;

wherein a finder body frame is provided, said finder body frame holding therein said objective lens, said at least one movable lens, and said cam member, and having means for attachment of the finder body frame to a camera body; and wherein the gears of said gear train are directly attached to said finder body frame.

2. The zoom finder according to claim 1, comprising a gear holding plate holding said gear train and being attached to said finder body frame.

3. A camera comprising:

a zoom finder including an objective lens, a movable lens, a cam member for driving said movable lens, and a finder body frame for holding said objective lens, said movable lens and said cam member, said finder body frame having means for attachment thereof to a camera body;

driving means for changing the focal length of a taking lens;

a motor for supplying motive power to said cam member and said driving means;

a gear member for distributing the motive power of said motor to said cam member and said driving means; and a gear train for transmitting the motive power from said gear member to said cam member, said gear train comprising a plurality of gear members directly attached to said finder body frame.

* * * * *